Figure 1:
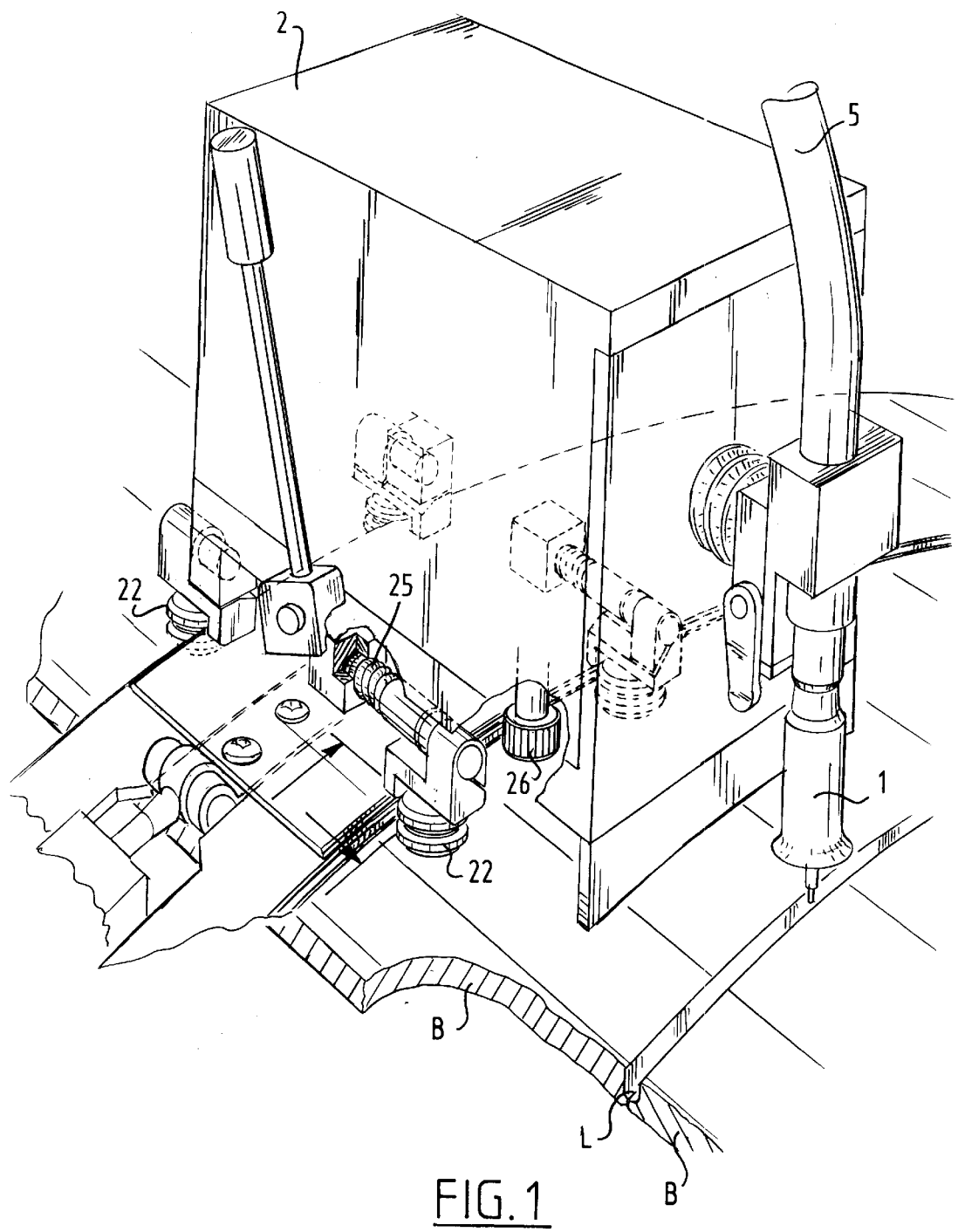

United States Patent [19]
Van Heuveln

[11] Patent Number: 5,944,248
[45] Date of Patent: Aug. 31, 1999

[54] APPARATUS FOR PROCESSING CURVED SURFACES

[75] Inventor: Joost Van Heuveln, Zoetermeer, Netherlands

[73] Assignee: Allseas Group S.A., Switzerland

[21] Appl. No.: 08/926,549

[22] Filed: Sep. 10, 1997

[30]     Foreign Application Priority Data

Sep. 10, 1996 [NL] Netherlands ............................ 1003998

[51] Int. Cl.6 .............................. B23K 37/02; B23K 1/00; B23K 9/12
[52] U.S. Cl. ................................ 228/45; 228/25; 228/29; 228/32; 219/125.11
[58] Field of Search ................................ 228/45, 25, 29, 228/32; 219/125, 60

[56]             References Cited

U.S. PATENT DOCUMENTS

| | | | |
|---|---|---|---|
| 2,705,629 | 4/1955 | Miller | 266/23 |
| 3,718,798 | 2/1973 | Randolph et al. | 219/60 A |
| 3,756,670 | 9/1973 | Harris | 308/6 R |
| 3,844,468 | 10/1974 | Nelson et al. | 228/13 |
| 3,873,798 | 3/1975 | Friedman et al. | 219/60 A |
| 3,910,480 | 10/1975 | Thatcher | 228/45 |
| 4,145,593 | 3/1979 | Merrick et al. | 219/60 A |
| 4,250,813 | 2/1981 | Slavens et al. | 104/118 |
| 4,269,552 | 5/1981 | Unigovsky et al. | 409/140 |
| 4,328,416 | 5/1982 | Dudley et al. | 250/202 |
| 4,726,300 | 2/1988 | Kazlauskas | 104/118 |
| 5,796,068 | 8/1998 | Jones | 219/121.63 |

*Primary Examiner*—Patrick Ryan
*Assistant Examiner*—Kiley Stoner
*Attorney, Agent, or Firm*—Mark Zovko

[57]             ABSTRACT

An apparatus for processing curved surfaces, in particular a pipe surface, using processing means which are guided over that surface at a distance thereabove by means of a guide to be pre-arranged on that surface, wherein the guide consists of a flexible body provided with two parallel edges witch extend some distance above the surface for processing, and a carrier for the processing means is provided with a follower system consisting of at least three follower members which are ordered in a triangle and which co-act with the edges, this such that the carrier follows the curved surface at a fixed distance during movement along the guide, whereby processing of the surface can be performed under uniform conditions which enhances precision and therefore quality.

5 Claims, 3 Drawing Sheets

APPARATUS FOR PROCESSING CURVED SURFACES

The invention relates to an apparatus for processing curved surfaces, in particular a pipe surface, using processing means which are guided over that surface at a distance thereabove by means of a guide to be pre-arranged on that surface.

The processing of surfaces must be understood to mean performing welding operations, wherein a fixed distance of the welding torch to the surface must be followed during laying of the welded joint, or for instance during painting of the surface, wherein the spray nozzle for the paint must likewise have a fixed distance.

The problem than occurs here is that with the known machines the distance cannot be maintained precisely and particularly not in the case of curved surfaces, for instance the outer side of pipes and the like to be welded together. This can be attributed to the fact that the guide is arranged relatively independently of the surface and is per se relatively rigid.

The invention has for its object to obviate the above stated drawback and to this end proposes an apparatus wherein the processing member can follow the curved surface precisely.

The apparatus according to the invention is distinguished in that the guide consists of a flexible body provided with two parallel edges which extend some distance above the surface for processing, and a carrier for the processing means is provided with a follower system consisting of at least three follower members which are ordered in a triangle and which co-act with the edges, this such that the carrier follows the curved surface at a fixed distance during movement along the guide.

Owing to the flexible body which is applied as guide for the processing means, for instance the welding torch, it is possible by folding the flexible body accurately along the curved surface, which body is itself embodied with a parallel guide for the movement of the processing means along the surface, for this processing means to easily follow the curved surface.

In a preferred embodiment the flexible body is embodied as a band with parallel edges, which band is provided on the side facing the surface for processing with spacer members of equal length.

In exceptionally simple manner the flexible body is hereby held at a precise distance from the surface for processing owing to the spacer members of equal length, wherein the parallel edges of the band provide the guiding.

The follower member of the carrier is preferably embodied as a running wheel with V-shaped peripheral running surface enclosing the edge of the guide. Due to the V-shaped groove the distance between the follower and the curved surface is maintained precisely.

When the band is embodied with tensioning means for forming a peripheral ring round the curved surface, in particular the outer surface of a pipe, it is then further recommended to arrange a connecting plate at the transition of the mutually facing ends of the band, which plate extends over these ends. The connecting plate preferably has a side edge set back from the guide edge such that the V-shaped running wheel runs without jolting onto the connecting plate and to the other end of the tensioning guide belt. Thus is ensured that very percise welds can be laid without any change in e joint thickness.

Figure 2:
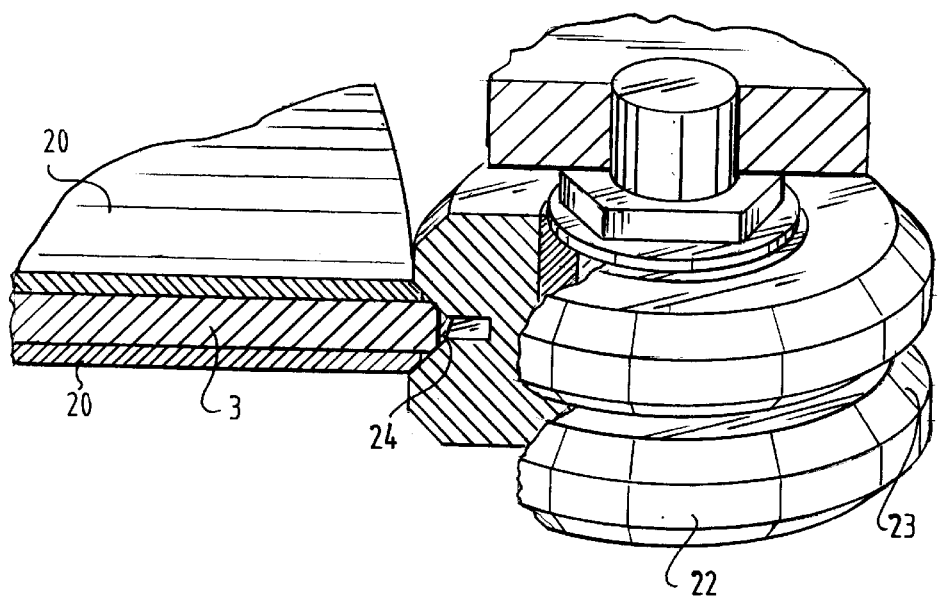
Figure 3:
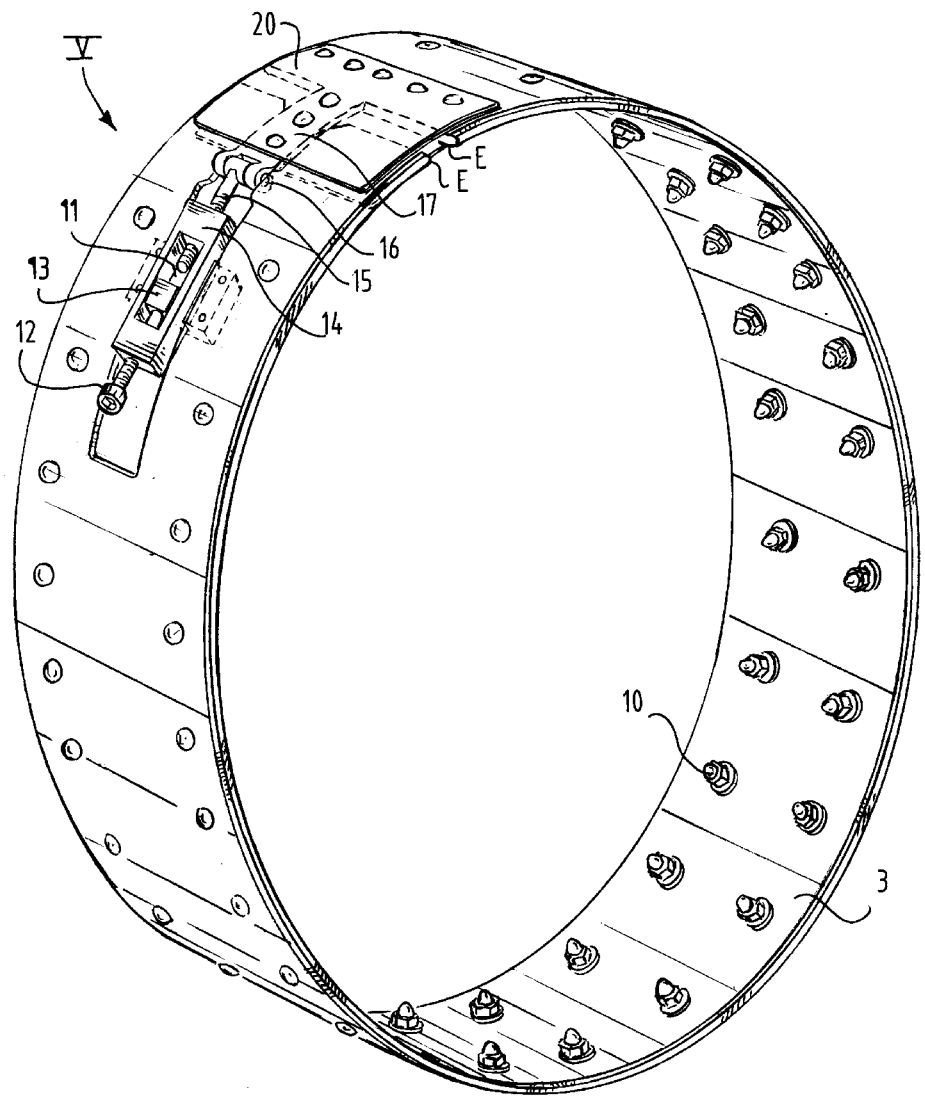

Above mentioned and other features will be further elucidated hereinbelow in the figure description of an embodiment. In the drawing:

FIG. 1 shows a detail of a guide band round a curved pipe surface with a welding torch as processing member, FIG. 2 shows a detail of the running wheel of the carrier for the welding torch of FIG. 1, FIG. 3 shows a detail of the guide band applied in the apparatus of FIG. 1 and 2.

Shown schematically in FIG. 1 is an apparatus for welding together pipes B which must be welded together seamlessly on the end edges.

The weld groove which is applied for fixing together the pipe ends can be of random nature and is for instance U-shaped, see for instance in FIG. 1 at L.

such weld grooves are filled in a number of passes of the welding torch with which a layer of the welding material is laid in the groove at each pass. For this purpose one or more welding torches can be applied, which are shown here in FIG. 1 as processing member with the numeral 1. The welding torch is supported by a carrier 2 which its guided along a guide 3 (FIG. 2) which is fixed round one of the pipe ends. The pipe can be rotated on its longitudinal axis but it is more usual to move the carriers 2 relative to the pipe surface. For this purpose the welding torch 1 is connected to a flexible feed pipe 5 for the protective gas, which feed pipe 5 is coupled to a gas supply system which is assumed known and forms no part of the invention.

It will be apparent that in order to lay a weld in the groove L the distance between welding torch 1 and the surface of the pipe respectively the weld groove L must be very precise so as not to cause any changes of thickness and unevenness in the welded joint for laying.

According to the invention a guide, here in the form of a band-like flexible body 3, is clamped for this purpose round the pipe end. In FIG. 3 the flexible body 3 is formed into a ring, wherein spacers 10 are arranged on the inside of the ring in a regular distribution over the surface. The inward pointing spacers 10 come to lie against the outer surface of the pipe in FIG. 1 when the band is biased by means of a tensioning system generally designated with 11. The tensioning system can be of random type but consists here of a tightening screw 12 which supports on a support block 13 connected to the one end of the band. Screw 12 is received in a threaded hole of a screw block 14 which is itself connected to a screw 15 which is pivotally connected at 16 to a lip 17 which is fixed to the other end of the band. By tightening screw 12 the ends E can be pulled toward each other and spacers 10 will be pressed firmly onto the outer surface of the pipe.

A further feature of the invention is that the gap between the ends E of the band are spanned by a connecting plate 20 which is here slightly narrower than the guiding side edges of the belt, this being further elucidated hereinbelow.

Returning to FIG. 1, the torch is arranged in a follower member in the form of a carrier 2, which can be of random form but is provided with four guide wheels 22 which have a V-shaped peripheral surface 23, see FIG. 2. This V-shaped peripheral surface receives the guiding edge 24 of guide band 3.

By biasing the wheels located mutually opposite in FIG. 1 toward each other, for instance with a set of belleville springs 25, the wheel pair is held and pressed firmly against the sides of the guide band.

It will be apparent that at the transition E-E at the band ends such a guide construction causes an unevenness in the path for carrier 2. In order to make this transition possible, the above mentioned closing plate 20 is arranged on the upper side and lower side of the ends, the side edge of which plate is set back from the end edge of the band 3 itself, see FIG. 2. Where the side edge of the band is not present the V-shaped guide surface of running wheel 22 will pass without jolting over the side edge of the top and bottom plate 20, this being shown in FIG. 2.

The driving of carrier 2 along guide 3 can take place in a random manner. It is carried out here by means of a drive wheel 26 which engages on the side edge of the guide and is driven by a drive mechanism (not shown) accommodated in the housing of carrier 2.

It will be apparent from the foregoing that due to the flexible body the non-round form of the pipe ends of the pipes B for welding can easily be followed. This non-round form is immediately followed by the flexible band guide element 3 whereby the torch 1 will continue to follow the surface precisely.

The invention is not limited to the above described embodiment and certainly not to the processing of surfaces of pipes. Larger surfaces can be envisaged here, for instance the ship's hull, which must be painted and the like, wherein a flexible guiding edge can be mounted in appropriate manner, whereby a carrier guided therealong will continue to follow the surface precisely.

I claim:

1. Apparatus for processing curved surfaces, in particular a pipe surface, using processing means which are guided over that surface at a distance thereabove by means of a guide to be pre-arranged on that surface, characterized in that the guide consists of a band provided with two parallel edges which extend some distance above the surface for processing, said band having two ends and said band provided on the side facing the surface for processing with spacer members of equal length, and a carrier for the processing means provided with a follower system having at least one follower member, said follower member having a running wheel with a V-shaped peripheral running surface having flanks enclosing the edge of the said band, and one of the ends of said band is provided with a connecting plate extending over the other end of said band, the side edge of said connecting plate is set back in a beveled way such that the flank of said V-shaped peripheral running surface of said follower member passes over the side edge of said connecting plate without jolting during operation of the apparatus.

2. The apparatus of claim 1 which includes at least three follower members spaced equidistant around the pipe surface.

3. The apparatus of claim 1 in which said follower member has a least one running wheel biased in the direction of the other running wheels using spring tensioning.

4. The apparatus of claim 1 in which the ends of said band are provided with tensioning means such that said band can be tightened as a ring around the pipe surface.

5. The apparatus of claim 1 wherein the apparatus supports at least one welding machine, said welding machine provided with drive means comprising a drive wheel rolling along the side edge of said band, said drive wheel driven by a stepping motor.

* * * * *